(12) United States Patent
Sonehara et al.

(10) Patent No.: US 8,363,399 B2
(45) Date of Patent: Jan. 29, 2013

(54) ELECTRONIC APPARATUS INCLUDING A REINFORCEMENT PORTION

(75) Inventors: Takashi Sonehara, Nagano (JP); Kiyokuni Arima, Nagano (JP)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 12/630,104

(22) Filed: Dec. 3, 2009

(65) Prior Publication Data

US 2010/0165556 A1 Jul. 1, 2010

(30) Foreign Application Priority Data

Dec. 26, 2008 (JP) ................. 2008-331971

(51) Int. Cl.
*H05K 5/00* (2006.01)
(52) U.S. Cl. ............... 361/679.57; 361/679.01; 361/726
(58) Field of Classification Search ............. 361/679.01, 361/679.57, 726

See application file for complete search history.

(56) References Cited

U.S. PATENT DOCUMENTS

| 5,987,937 | A | * | 11/1999 | Lee ................................... 70/14 |
| 6,088,229 | A | * | 7/2000 | Seto et al. ..................... 361/726 |
| 6,791,825 | B1 | * | 9/2004 | Taylor ....................... 361/679.6 |
| 7,283,356 | B2 | * | 10/2007 | Kobayashi et al. ...... 361/679.31 |
| 2007/0223182 | A1 | * | 9/2007 | Swan et al. .................... 361/679 |
| 2008/0037210 | A1 | * | 2/2008 | Cheng ........................... 361/683 |
| 2009/0140618 | A1 | * | 6/2009 | Kodaira ..................... 312/223.6 |
| 2010/0149744 | A1 | * | 6/2010 | Kitamura et al. ......... 361/679.27 |

FOREIGN PATENT DOCUMENTS

JP 2008-233337 10/2008

* cited by examiner

*Primary Examiner* — Hung S Bui
*Assistant Examiner* — James Wu
(74) *Attorney, Agent, or Firm* — Oblon, Spivak, McClelland, Maier & Neustadt, L.L.P.

(57) ABSTRACT

An electronic apparatus includes a casing and a first reinforcement portion. The casing is rectangular and includes, on a first side wall of a first corner portion, a first hole portion into which an antitheft member is capable of being inserted. The first reinforcement portion is opposed to an inner side of the first side wall of the first corner portion and includes a second hole portion that is in communication with the first hole portion and constitutes a fixing hole capable of fixing the antitheft member together with the first hole portion.

9 Claims, 14 Drawing Sheets

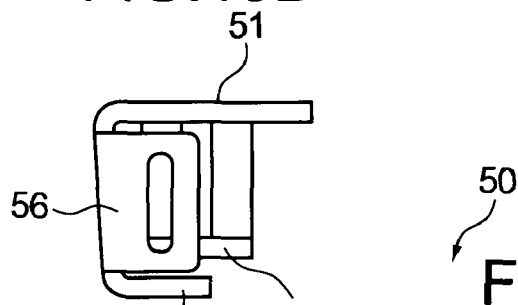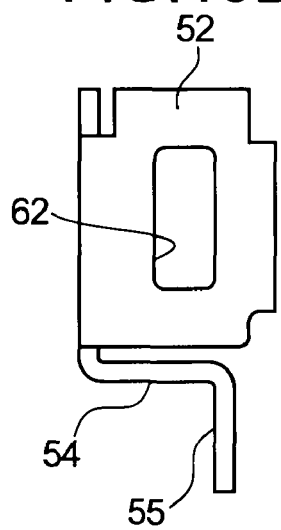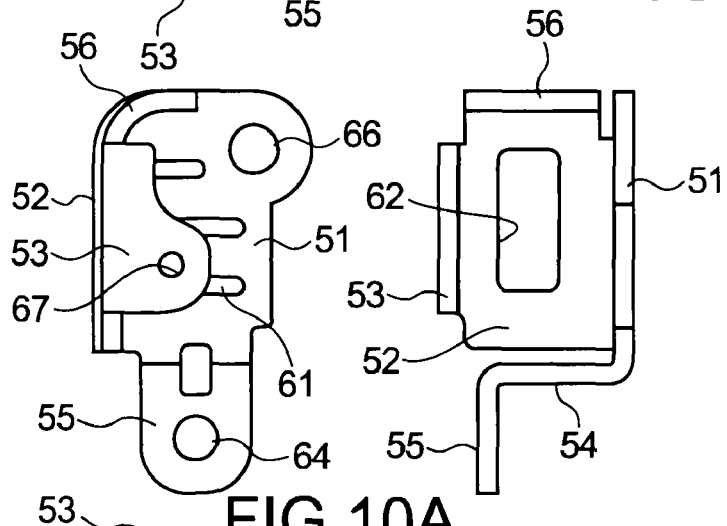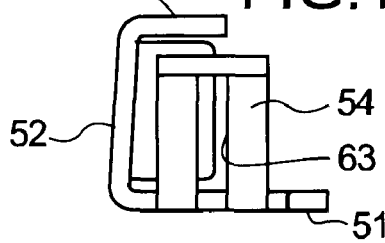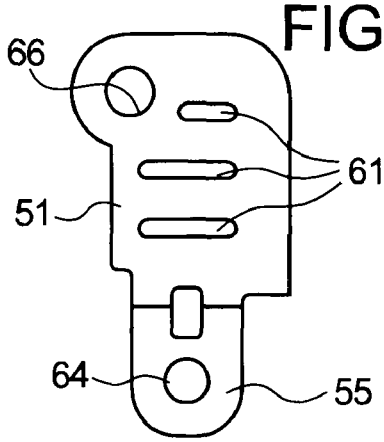

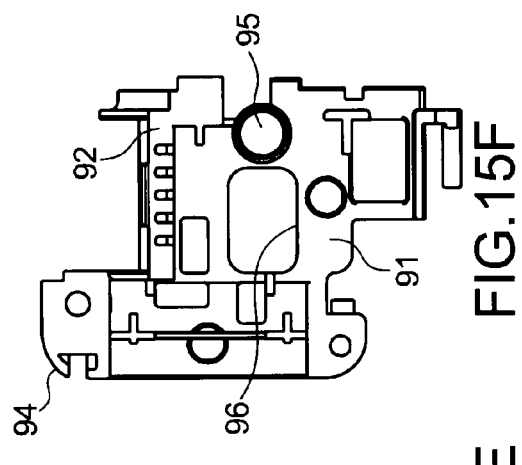
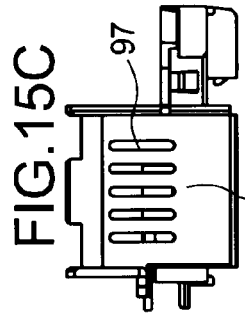
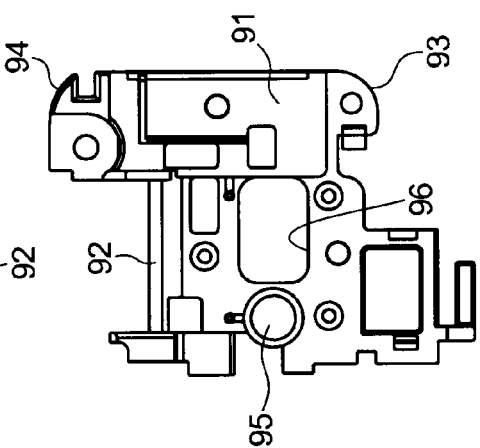
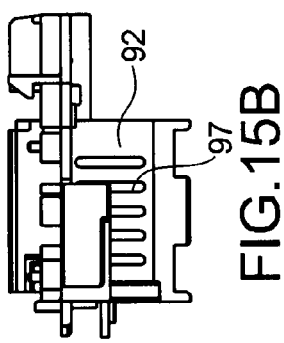
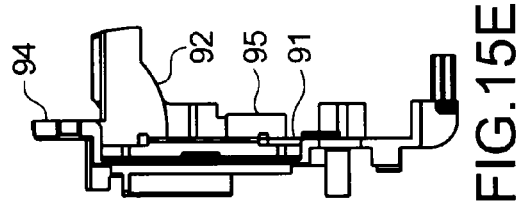
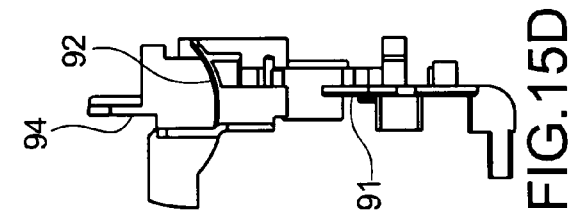

ELECTRONIC APPARATUS INCLUDING A REINFORCEMENT PORTION

BACKGROUND OF THE INVENTION

1. Field of the Invention

The present invention relates to an electronic apparatus such as a laptop personal computer.

2. Description of the Related Art

In recent years, electronic apparatuses that users are capable of carrying, such as a cellular phone and a laptop personal computer, are in wide use. Since those electronic apparatuses are carried by users, the apparatuses are required to have a sufficient structure and strength to endure an impact of a vibration, a drop, and the like.

Disclosed as a technique of preventing a display apparatus of an electronic apparatus from being damaged by a drop of the electronic apparatus is, for example, a technique of providing a beam that extends toward an upper casing disposed on an upper side of a display apparatus from an inner surface of a lower casing disposed on a lower side of the display apparatus. For example, since a tip end of the beam comes into contact with the upper casing when the electronic apparatus is dropped and an impact is thus applied thereto, a load applied to the display apparatus is reduced to prevent the display apparatus from being damaged (see, for example, Japanese Patent Application Laid-open No. 2008-233337 (paragraphs (0013) and (0014), FIG. 4).

SUMMARY OF THE INVENTION

With the technique described above, however, it is difficult to prevent corner portions of the electronic apparatus from being damaged although it is possible to prevent the display apparatus of the electronic apparatus from being damaged. Thus, there is a problem that, when the electronic apparatus is dropped, a large impact is easily applied to the corner portions of the electronic apparatus to thus damage areas near the corner portions.

Though it is possible to newly provide a reinforcement member such as a reinforcement rib in the vicinity of the corner portions of the casing constituting the electronic apparatus to reinforce the areas near the corner portions of the casing, reinforcement with the reinforcement ribs and the like is not enough to endure the drop impact of the electronic apparatus, and the reinforcement ribs will thus be bent, which is problematic. Moreover, there is another problem that the electronic apparatus becomes heavier when new reinforcement members are provided near the corner portions in order to reinforce the corner portions of the electronic apparatus with respect to the drop impact and the like.

In view of the circumstances as described above, there is a need for an electronic apparatus that is capable of preventing corner portions from being damaged by an impact externally applied thereto while realizing a reduction in weight.

According to an embodiment of the present invention, there is provided an electronic apparatus including a casing and a first reinforcement portion. The casing is rectangular and includes, on a first side wall of a first corner portion, a first hole portion into which an antitheft member is capable of being inserted. The first reinforcement portion is opposed to an inner side of the first side wall of the first corner portion and includes a second hole portion that is in communication with the first hole portion and constitutes a fixing hole capable of fixing the antitheft member together with the first hole portion.

In the embodiment of the present invention, the casing includes the first hole portion into which the antitheft member is capable of being inserted, and the first reinforcement portion is opposed to the inner side of the first side wall of the first corner portion and includes the second hole portion that constitutes the fixing hole capable of fixing the antitheft member together with the first hole portion. Therefore, it is possible to reinforce the side wall of the first corner portion as well as fix the antitheft member to the fixing hole and prevent the electronic apparatus from being stolen. In other words, the first reinforcement portion can also be used as the fixing hole of the antitheft member. As a result, it is possible to prevent the corner portions of the casing from being damaged by an impact externally applied thereto while realizing a reduction in weight of the electronic apparatus.

The first reinforcement portion may be provided along a first inner surface of the first side wall of the first corner portion. With this structure, the first corner portion can be reinforced more positively by the first reinforcement portion.

The electronic apparatus may further include an input signal control board provided near a second corner portion of the casing different from the first corner portion and a second reinforcement portion that is opposed to an inner side of a second side wall of the second corner portion and supports the input signal control board.

With this structure, it is possible to support the input signal control board as well as reinforce the second side wall of the second corner portion by the second reinforcement portion. In other words, the second reinforcement portion can also be used for supporting the input signal control board. As a result, it is possible to prevent the second corner portion of the casing from being damaged by an impact externally applied thereto while realizing a reduction in weight of the electronic apparatus.

The second reinforcement portion may be provided along a second inner surface of the second side wall of the second corner portion. With this structure, the second corner portion can be reinforced more positively by the second reinforcement portion.

The electronic apparatus may further include a third reinforcement portion provided adjacent and opposed to a third inner surface of a third side wall of a third corner portion of the casing different from the first corner portion and the second corner portion. With this structure, the third corner portion of the casing can be reinforced more positively by the third reinforcement portion provided adjacently along the third inner surface of the third side wall of the third corner portion.

The casing may include a flat plate portion connected to the first side wall, the second side wall, and the third side wall, the third side wall of the third corner portion may be tilted with respect to the flat plate portion such that it tilts outwardly from an edge of the flat plate portion, and the third reinforcement portion may be in contact with the third inner surface in the vicinity of a position at which the third side wall of the third corner portion sticks out most from the edge of the flat plate portion.

With this structure, the third reinforcement portion can positively reinforce areas in the vicinity of the position at which the third corner portion sticks out most from the edge of the flat plate portion, and a most-vulnerable part of the third corner portion can be reinforced positively.

As described above, according to the embodiment of the present invention, it is possible to prevent corner portions from being damaged by an impact externally applied thereto while realizing a reduction in weight.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 are a six-sided view of the antitheft reinforcement plate shown in FIG. 9;

FIG. 15 are a six-sided view of the mold member provided at the corner portion D shown in FIG. 12.

DESCRIPTION OF PREFERRED EMBODIMENTS

Hereinafter, an embodiment of the present invention will be described with reference to the drawings.

(Structure of Electronic Apparatus)

Figure 1:
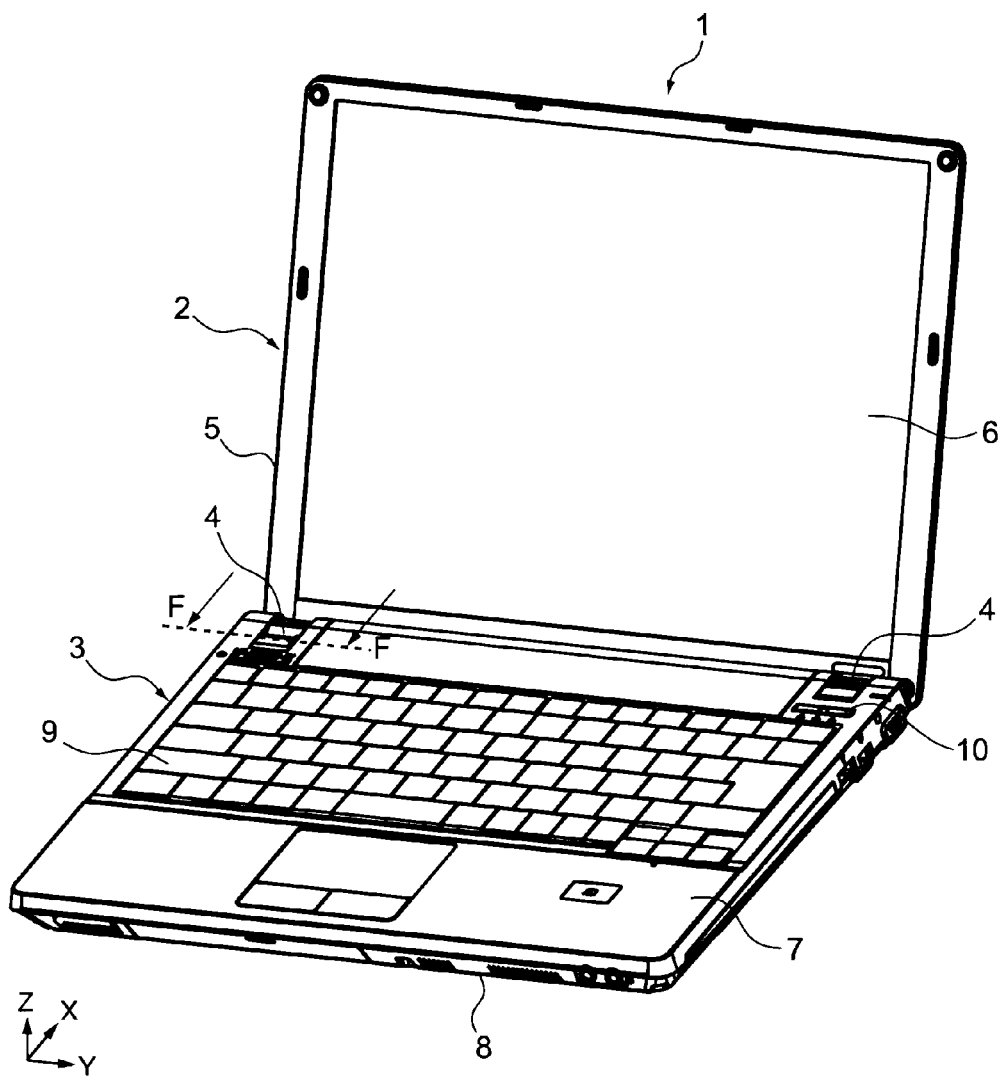
FIG. 1 is a perspective view of an electronic apparatus according to an embodiment of the present invention.

FIG. 1 is a perspective view of an electronic apparatus according to an embodiment of the present invention.

An electronic apparatus 1 includes a display portion 2, a main body portion 3, and a hinge coupling portion 4 that rotatably couples the display portion 2 and the main body portion 3.

The display portion 2 is openable/closable with respect to the main body portion 3 via the hinge coupling portion 4. The display portion 2 includes a casing 5 of the display portion 2, a display screen 6, and a display panel (not shown) that is provided inside the casing 5 and carries out display processing.

The casing 5 is an exterior component of the display portion 2 that accommodates a display processing unit (not shown). The display screen 6 is a screen for displaying information and faces the main body portion 3 in a closed state.

The main body portion 3 includes a palm rest 7 constituting an upper-side exterior of the main body portion 3, a bottom 8 constituting a bottom-side exterior of the main body portion 3, a keyboard unit 9, and components such as a central processing unit (not shown) and a hard disk apparatus (not shown).

The palm rest 7 and the bottom 8 are exterior components of the main body portion 3. The palm rest 7 and the bottom 8 are both plate-like, and a combination of the palm rest 7 and the bottom 8 constitutes an exterior surface of the main body portion 3. The keyboard unit 9 includes, for example, a plurality of keys and functions as an input portion of the electronic apparatus 1. The central processing unit is mounted on a multilayer printed-wiring board inside the bottom 8. Upon receiving input signals from the keyboard unit 9, the central processing unit carries out various processing such as operational processing, control processing, image processing, and output processing with respect to the display portion 2, and practically functions as a functional main body of the electronic apparatus 1. The hinge coupling portion 4 rotatably couples the display portion 2 and the main body portion 3. A plurality of buttons 10 used for executing predetermined switch operations by a user are provided on the main body portion 3.

Figure 2:
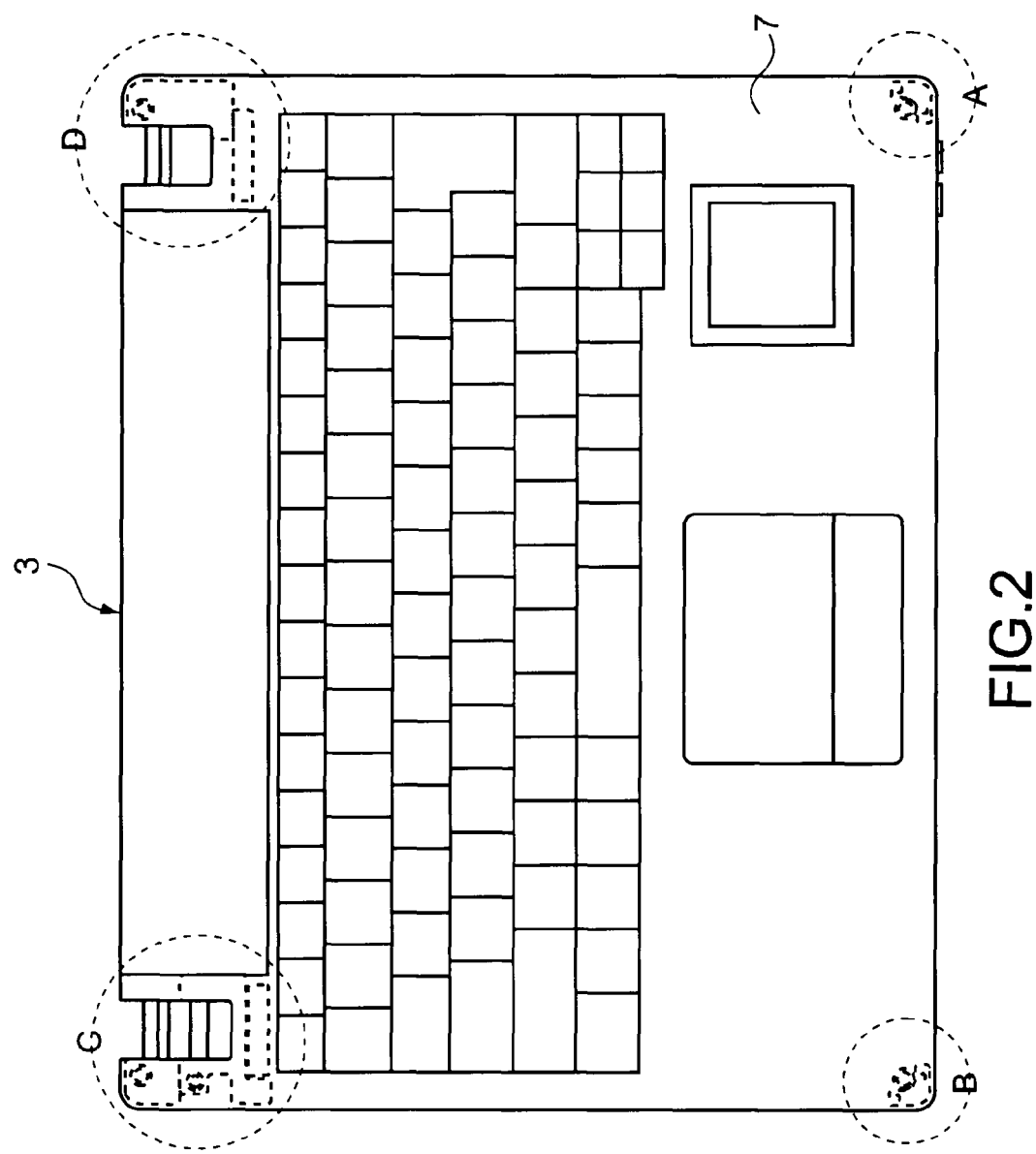
FIG. 2 is a plan view of a main body portion of the electronic apparatus shown in FIG. 1.

FIG. 2 is a plan view of the main body portion 3 of the electronic apparatus 1 shown in FIG. 1. It should be noted that in FIG. 2, schematic internal structures of the main body portion 3 in the vicinity of four corner portions are illustrated inside the dotted lines.

The main body portion 3 includes, at four corner portions A, B, C, and D thereof, reinforcement structures for reinforcing the corner portions A, B, C, and D. Hereinafter, the corner portions A, B, C, and D will be described in detail.

Figure 3:
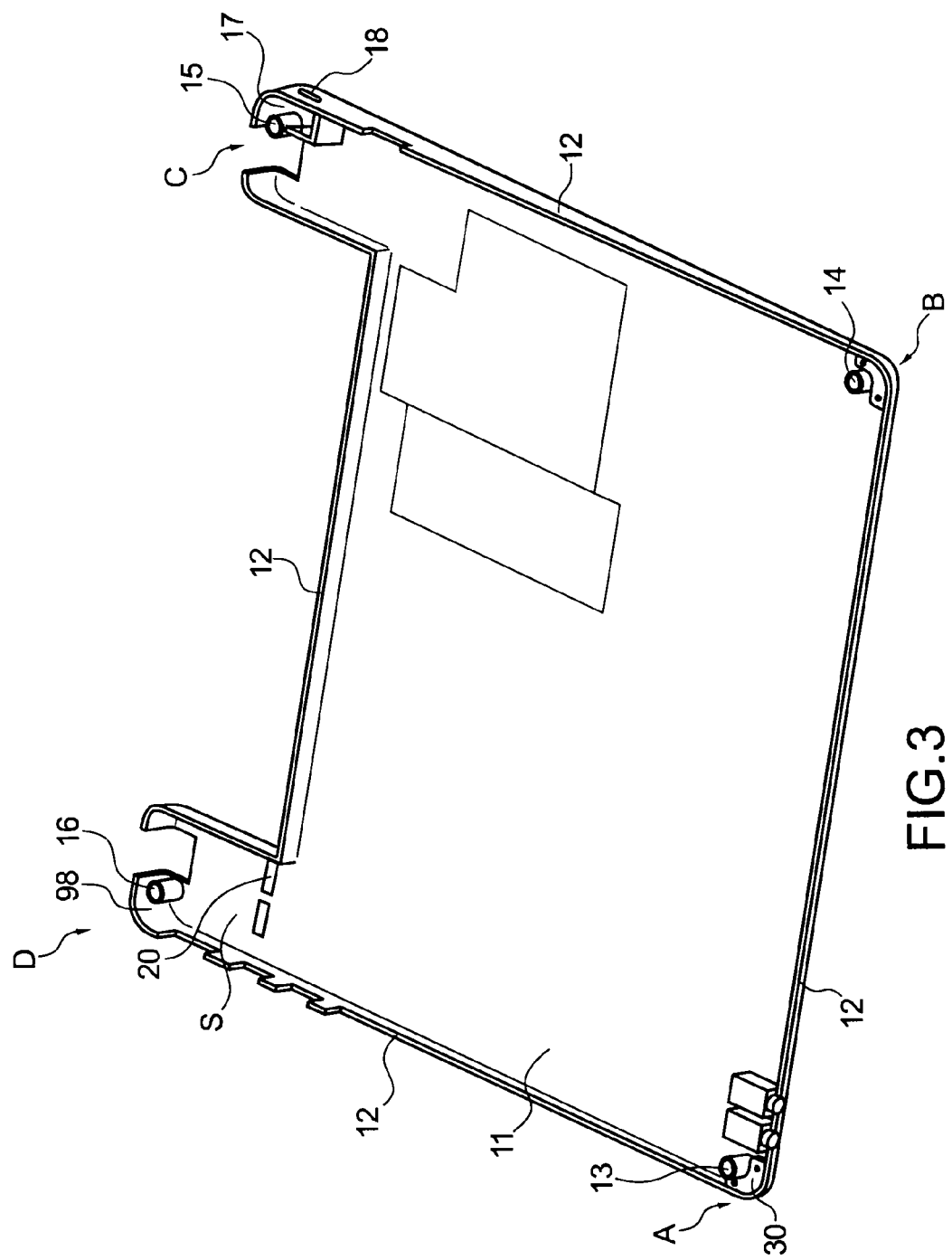
FIG. 3 is a perspective view of a palm rest of the main body portion shown in FIG. 2.

FIG. 3 is a perspective view of the palm rest 7 of the main body portion 3 shown in FIG. 2. Specifically, FIG. 3 is a diagram in which an inner-surface side of the palm rest 7 that has been removed from the main body portion 3 is facing upward.

The palm rest 7 includes a flat plate portion 11 that covers the multilayer printed-wiring board and the like and a side wall 12 erected from an outer circumference of the flat plate portion 11. In the vicinity of the corners of the flat plate portion 11, the side wall 12 is bent along those corners to thus constitute the corner portions. In the vicinity of the four corner portions A, B, C, and D of the palm rest 7, bosses 13, 14, 15, and 16 are provided protrusively. The bosses 13 to 16 protrude from an inner bottom surface of the flat plate portion 11. The bosses 13 to 16 are used for screwing the palm rest 7 and the bottom 8 together.

At the corner portion C of the palm rest 7, a hole portion 17 into which an antitheft reinforcement member to be described later, that has both an antitheft function and a reinforcement function, is inserted is formed. On the side wall 12 near the corner portion C, an elongate hole 18 as a hole portion into which an antitheft lock portion is inserted is formed.

At the corner portion D of the palm rest 7, a space S for accommodating a switch substrate and a mold member to be described later is formed. In the vicinity of the corner portion D of the palm rest 7, a plurality of through-holes 20 into which the plurality of buttons 10 shown in FIG. 1 are inserted in a pressable state are formed.

(Structure of Corner Portion A)

Figure 4:
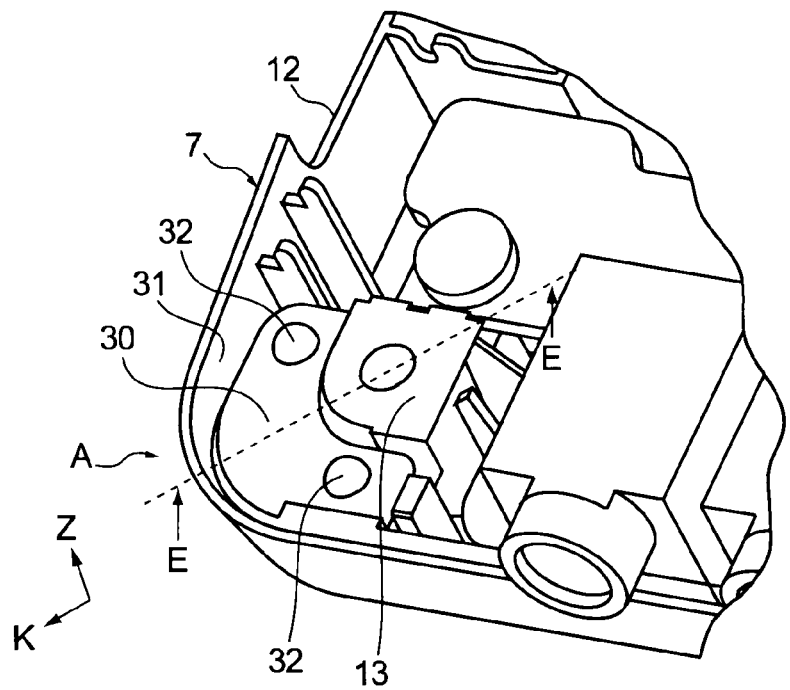
FIG. 4 is an enlarged perspective view of a corner portion A of the palm rest shown in FIG. 3.
Figure 5A:
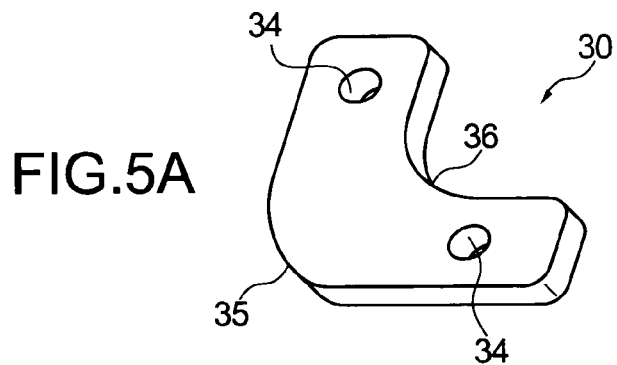
FIG. 5 are a perspective view and a plan view of a metal reinforcement plate shown in FIG. 4.
Figure 5B:
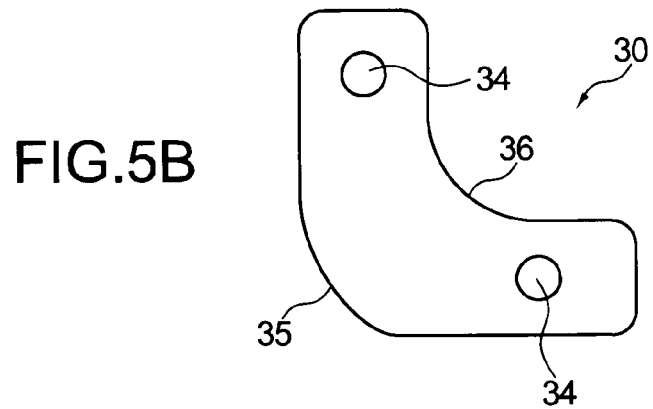
Figure 6:
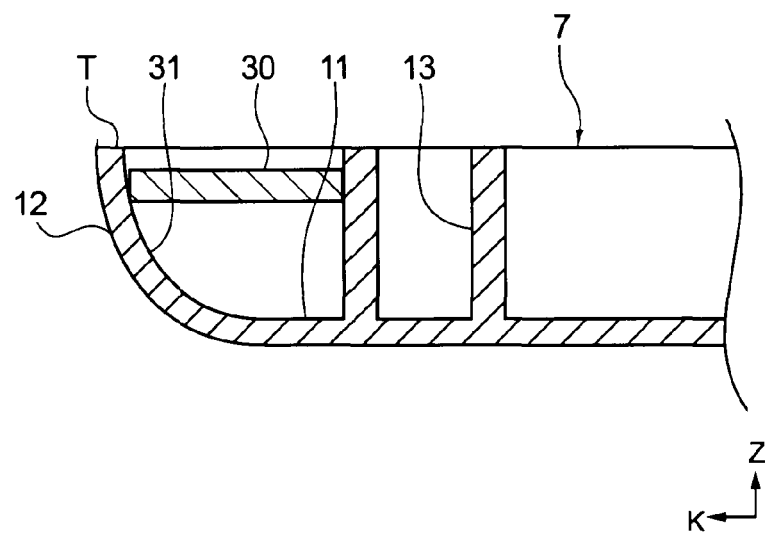
FIG. 6 is a cross-sectional diagram of the corner portion A of the palm rest shown in FIG. 4 taken along the line E-E.

FIG. 4 is an enlarged perspective view of the corner portion A of the palm rest 7 shown in FIG. 3. FIG. 5 are a perspective view and a plan view of a metal reinforcement plate shown in FIG. 4. FIG. 6 is a cross-sectional diagram of the corner portion A of the palm rest 7 shown in FIG. 4 taken along the line E-E.

A metal reinforcement plate 30 is interposed between an inner surface 31 of the side wall 12 in the vicinity of the corner portion A and an outer surface of the boss 13 almost with no gap. The metal reinforcement plate 30 is fixed to the palm rest 7 at a plurality of points by welds 32. The inner surface 31 of the side wall 12 in the vicinity of the corner portion A is curved. The metal reinforcement plate 30 is provided adjacently along the inner surface 31 of the curved side wall 12 while being opposed thereto. It should be noted that although this embodiment has shown the example in which the metal reinforcement plate 30 is welded at two points, the number of welding points is not limited thereto. Moreover, it is also possible for the metal reinforcement plate 30 to be screwed to the palm rest 7 at a plurality of points.

As shown in FIG. 5, the metal reinforcement plate 30 almost has an L shape, and through-holes 34 for welding are formed in the vicinity of end portions of that L shape. The metal reinforcement plate 30 includes a smoothly-curved surface 35 along the inner surface 31 of the side wall 12 and a smoothly-curved surface 36 along a side surface of the boss 13.

A thickness of the metal reinforcement plate 30 is set so as to provide, while realizing a reduction in weight, enough strength to prevent the palm rest 7 from being damaged in the vicinity of the corner portion A at a time the electronic apparatus 1 is dropped. Aluminum, for example, is used as a constituent material of the metal reinforcement plate 30, though not limited thereto. Other materials such as iron may be used as appropriate depending on a required reinforcement strength.

As shown in FIG. 6, the side wall 12 of the palm rest 7 is tilted with respect to the flat plate portion 11 so as to tilt outwardly from an edge of the flat plate portion 11. The metal reinforcement plate 30 is in contact with the inner surface 31 of the side wall 12 at a position near a position at which the side wall 12 sticks out most from the flat plate portion 11. In other words, the metal reinforcement plate 30 is provided at a position close to an edge T of the side wall 12 of the palm rest 7 in a height direction of the side wall 12 (Z direction in FIG. 6). As a result, the metal reinforcement plate 30 comes into contact with the inner surface 31 of the side wall 12 at a position near the position at which the side wall 12 sticks out most from the flat plate portion 11 in a K direction. The K direction used herein is a direction of a line segment that bisects an angle of the corner portion A (about 90 degrees).

(Structure of Corner Portion B)

Figure 7:
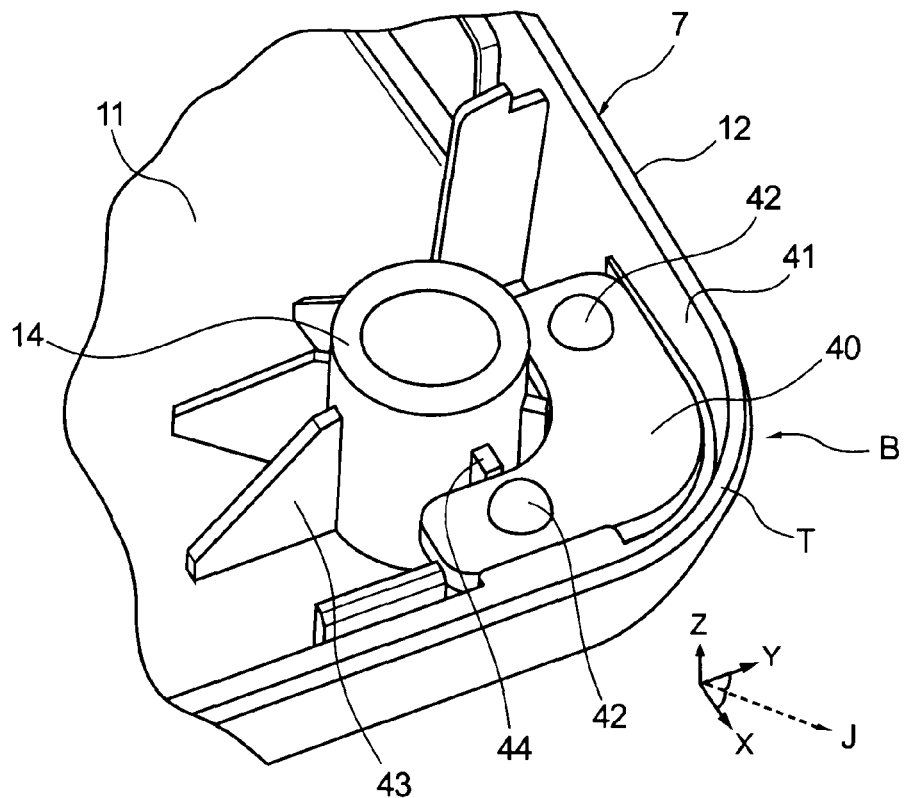
FIG. 7 is an enlarged perspective view of a corner portion B of the palm rest shown in FIG. 3.

FIG. 7 is an enlarged perspective view of the corner portion B of the palm rest 7 shown in FIG. 3.

A metal reinforcement plate 40 is interposed between an inner surface 41 of the side wall 12 in the vicinity of the corner portion B and a side surface of a boss 14 almost with no gap. The metal reinforcement plate 40 is fixed to the palm rest 7 at a plurality of points by welds 42. The inner surface 41 of the side wall 12 in the vicinity of the corner portion B is curved. The metal reinforcement plate 40 is provided along the inner surface 41 of the curved side wall 12. It should be noted that the number of welding points of the metal reinforcement plate 40 is not limited. Moreover, it is also possible for the metal reinforcement plate 40 to be screwed to the palm rest 7 at a plurality of points.

The metal reinforcement plate 40 is formed of the same material as the metal reinforcement plate 30. As a result, production costs of the metal reinforcement plates 30 and 40 can be reduced and productivities thereof can be improved.

A plurality of ribs 43 are formed on a circumferential side surface of the boss 14. A shape of ribs 44 provided between the boss 14 and the side wall 12 is adjusted so that the metal reinforcement plate 40 is fitted into a gap between the ribs 44 and the inner surface 41 of the side wall 12.

Similar to the side wall 12 shown in FIG. 6, at the corner portion B, the side wall 12 of the palm rest 7 is tilted so as to tilt outwardly from the edge of the flat plate portion 11 as shown in FIG. 7. In other words, the metal reinforcement plate 40 is provided at a position close to the edge T of the side wall 12 of the palm rest 7 in the height direction of the side wall 12 (Z direction in FIG. 7). As a result, the metal reinforcement plate 40 comes into contact with the inner surface 41 of the side wall 12 at a position near the position at which the side wall 12 sticks out most from the flat plate portion 11 in a J direction. The J direction used herein is a direction of a line segment that bisects an angle of the corner portion B (about 90 degrees).

(Structure of Corner Portion C)

Figure 8:
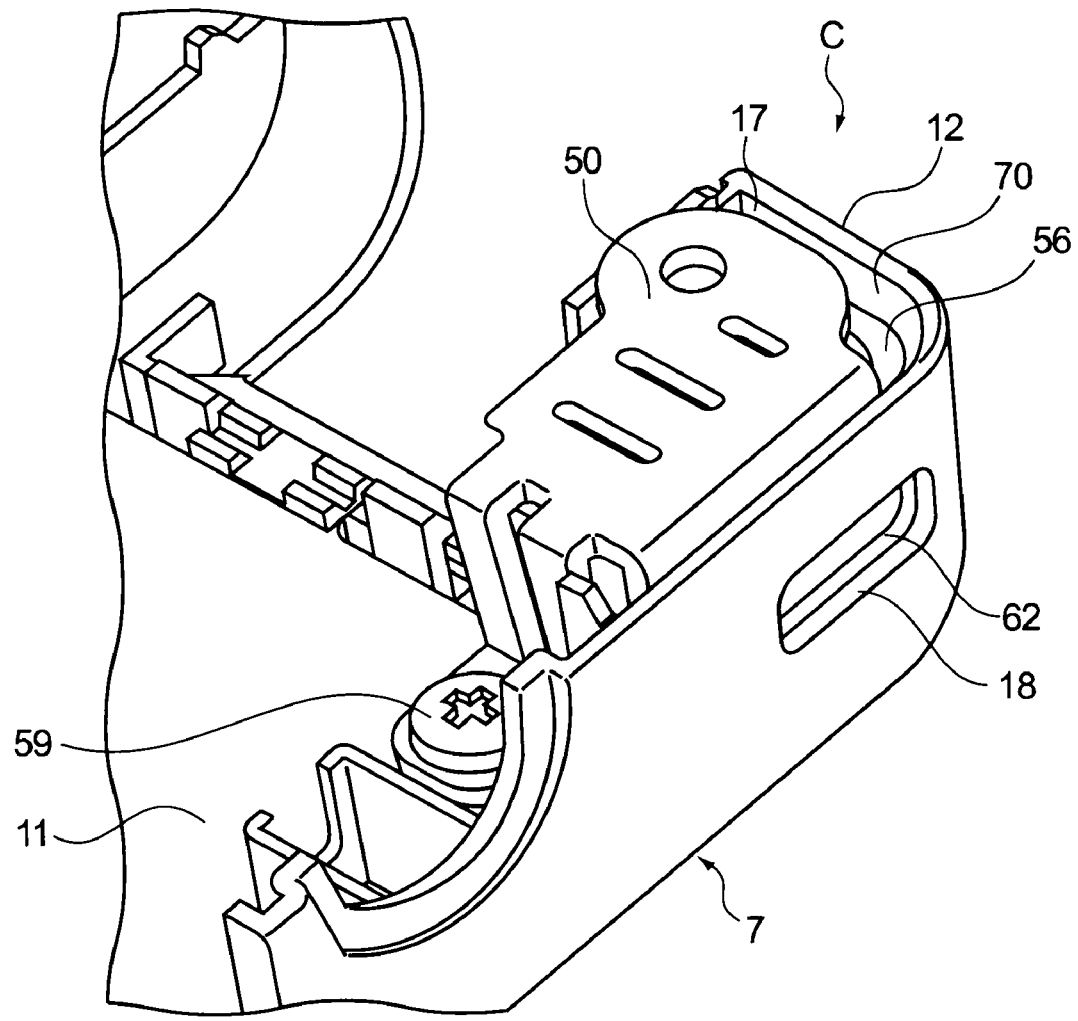
FIG. 8 is an enlarged perspective view of a corner portion C of the palm rest shown in FIG. 3.

FIG. 8 is an enlarged perspective view of the corner portion C of the palm rest 7 shown in FIG. 3. It should be noted that FIG. 8 shows an antitheft reinforcement plate not shown in FIG. 3.

An antitheft reinforcement member 50 is accommodated in the hole portion 17 of the palm rest 7. The antitheft reinforcement member 50 is screwed on the palm rest 7 side and the like with a screw 59.

Figure 9:
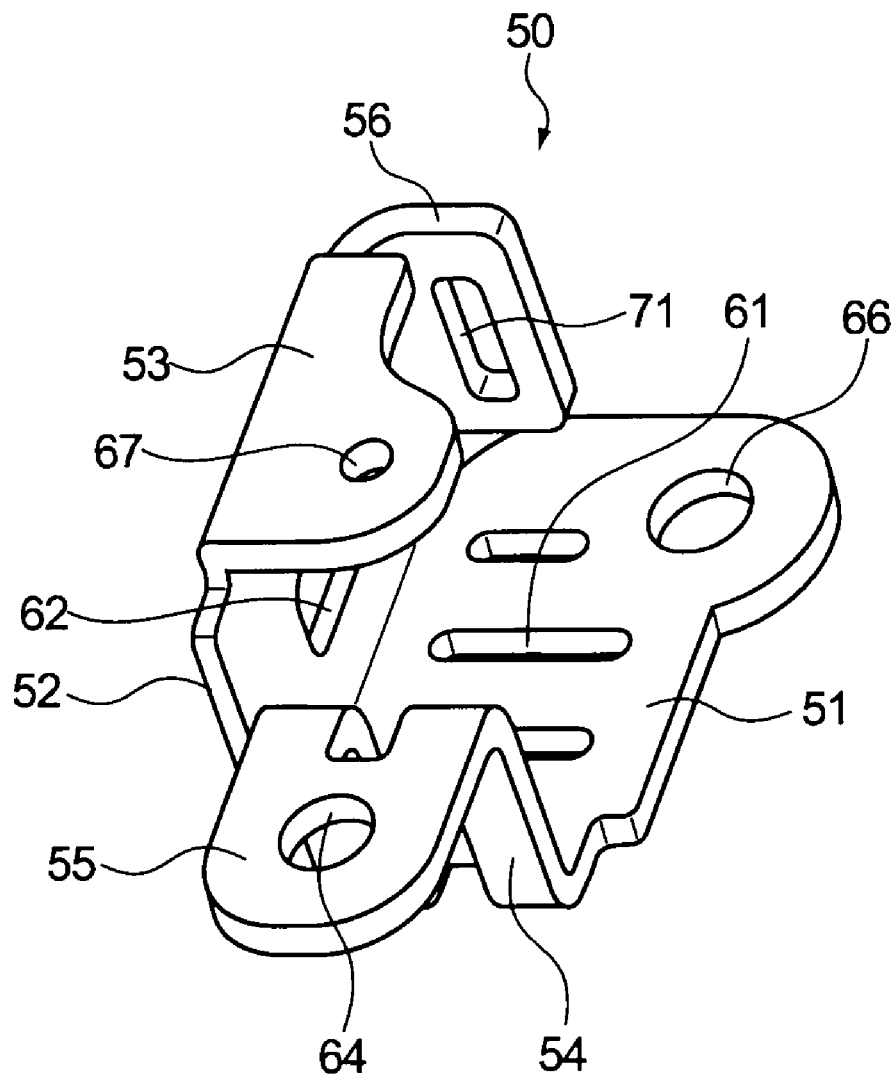
FIG. 9 is a perspective view of an antitheft reinforcement plate shown in FIG. 8.
Figure 11:
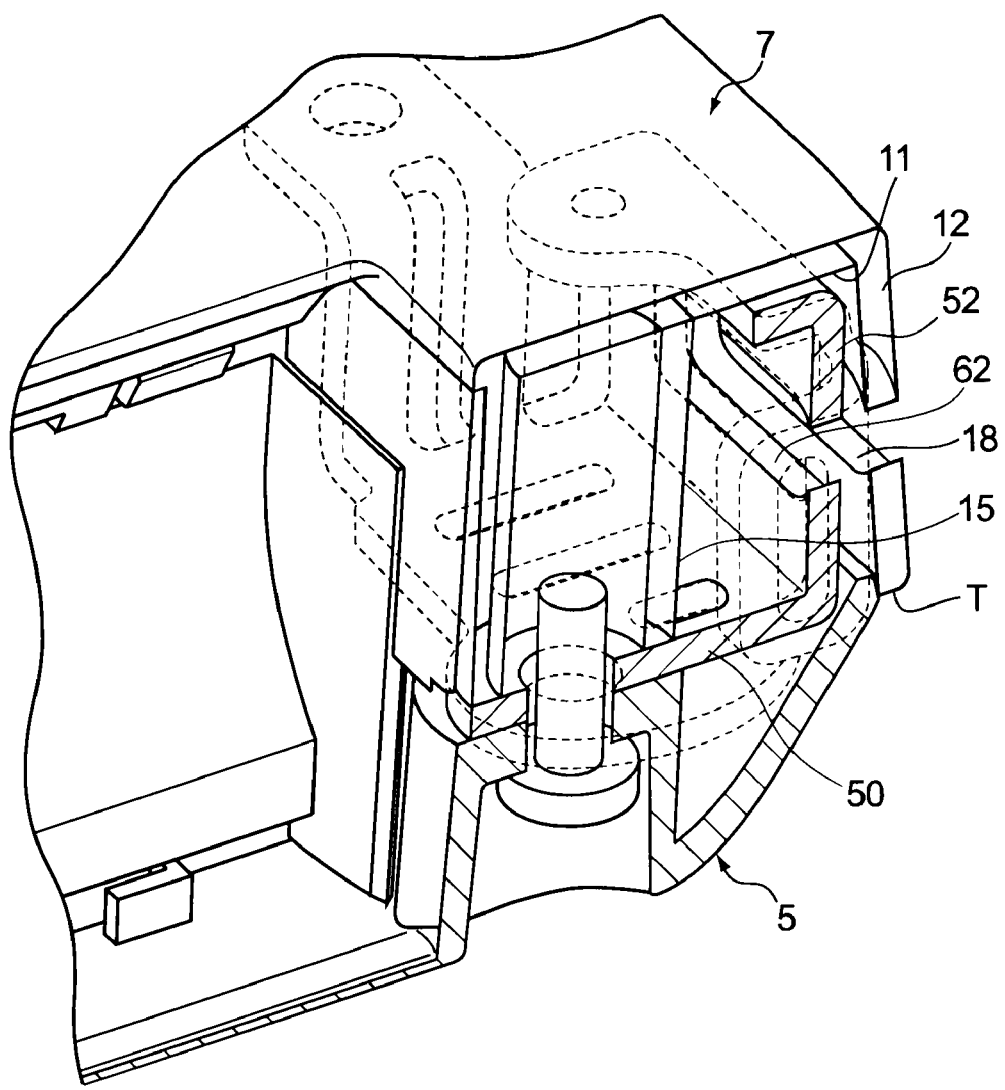
FIG. 11 is a cross-sectional diagram of the electronic apparatus shown in FIG. 1 taken along the line F-F.
Figure 16:
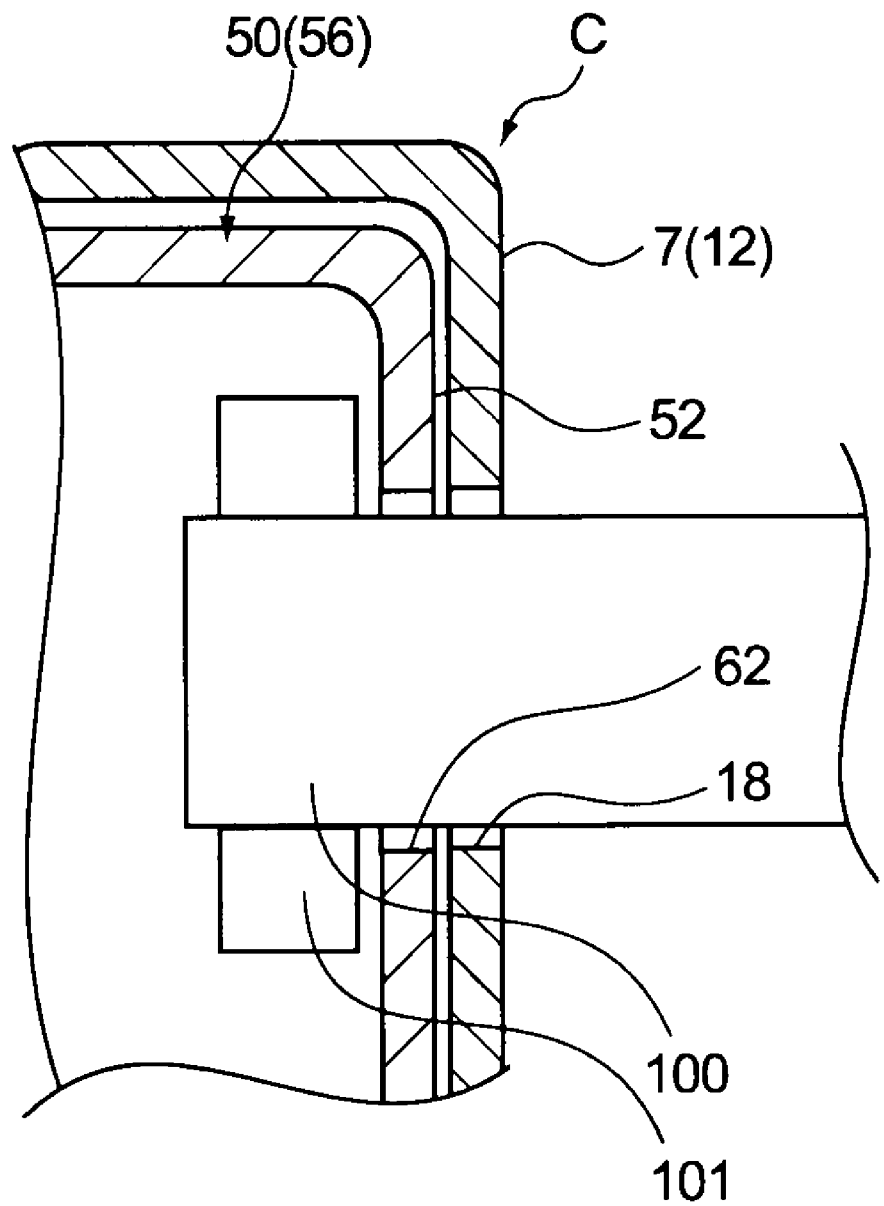
FIG. 16 is a diagram showing a state where an antitheft member is fixed to the antitheft reinforcement member.

FIG. 9 is a perspective view of the antitheft reinforcement member 50 shown in FIG. 8. FIG. 10 are a six-sided view of the antitheft reinforcement member 50 shown in FIG. 9. FIG. 11 is a cross-sectional diagram of the electronic apparatus 1 shown in FIG. 1 taken along the line F-F. FIG. 16 is a diagram showing a state where an antitheft member is fixed to the antitheft reinforcement member 50.

As shown in FIG. 9, the antitheft reinforcement member 50 includes a plane portion 51, a side reinforcement portion 52, a screwing portion 53, a fixing leg portion 54, a screwing portion 55, and a corner reinforcement portion 56.

A plurality of elongate holes 61 are formed on the plane portion 51 to thus realize a reduction in weight. The elongate holes 61 are formed at predetermined intervals so that a weight can be reduced while securing a strength of the plane portion 51. On the plane portion 51, a screw hole 66 into which a screw for fixing the plane portion 51 to the bottom 8 is inserted is formed (see FIG. 11). It should be noted that the number of screw holes 66 is not particularly limited.

The side reinforcement portion 52 is opposed to an inner surface 70 of the side wall 12 of the palm rest 7 at the corner portion C. The side reinforcement portion 52 is erected perpendicularly from the plane portion 51. The side reinforcement portion 52 reinforces the side wall 12 from an inner side as shown in FIG. 11. An angle of the side reinforcement portion 52 with respect to the plane portion 51, that is, an angle formed between the plane portion 51 and the side reinforcement portion 52 is smaller than 90 degrees (e.g., 87 degrees).

At a center of the side reinforcement portion 52, an elongate hole 62 that constitutes a fixing hole capable of fixing an antitheft lock portion together with the elongate hole 18 is formed. The elongate hole 62 has the same shape as the elongate hole 18 formed on the side wall 12 of the palm rest 7 (see FIGS. 8 and 11). Moreover, as shown in FIGS. 8 and 11, the antitheft reinforcement member 50 is screwed to the palm rest 7 and the bottom 8 so that the positions of the elongate hole 18 and the elongate hole 62 match. In other words, the elongate hole 18 and the elongate hole 62 are in communication with each other. Thus, a lock portion 100 shown in FIG. 16 as the antitheft member can be inserted into the fixing hole constituted of the elongate hole 18 and the elongate hole 62, and a latch portion 101 can be locked with respect to the elongate hole 62 from the outside, with the result that the electronic apparatus 1 can be prevented from being stolen.

More specifically, the lock portion 100 is connected to one end of a wire (not shown). By fixing the other end of the wire to an external desk or the like different from the electronic apparatus 1, the electronic apparatus 1 can be fixed to the desk or the like so that it is prevented from being stolen. Kensington Lock, for example, is used as the lock portion, though not limited thereto. It should be noted that when not locked, the lock portion 100 can be inserted into and taken out of the elongate holes 18 and 62.

The screwing portion 53 is formed parallel to the plane portion 51 at an edge of the side reinforcement portion 52. In other words, the screwing portion 53 is opposed to the plane portion 51. On the screwing portion 53, a screw hole 67 into which a screw for screwing the antitheft reinforcement member 50 on the palm rest 7 side is inserted is formed. The screw hole 67 has a smaller diameter than the screw hole 66.

The fixing leg portion 54 is erected perpendicularly from the plane portion 51, and the screwing portion 55 is provided perpendicular to the fixing leg portion 54 at an end thereof. The screwing portion 55 is parallel to the screwing portion 53. An elongate hole 63 is formed on the fixing leg portion 54. On the screwing portion 55, a screw hole 64 into which a screw for screwing the antitheft reinforcement member 50 on the palm rest 7 side is inserted is formed.

As shown in FIGS. 9 and 10, the corner reinforcement portion 56 extends from the side reinforcement portion 52 and is curved. As shown in FIG. 10, an outer surface of the side reinforcement portion 52 and an outer surface of the corner reinforcement portion 56 are connected smoothly and curved. The corner reinforcement portion 56 reinforces the corner portion C of the palm rest 7 as shown in FIG. 8. Specifically, the corner reinforcement portion 56 is provided along the inner surface 70 of the side wall 12 constituting the corner portion C of the palm rest 7 shown in FIG. 8. As a result, there is almost no gap between the corner reinforcement portion 56 and the inner surface 70 of the side wall 12 inside the hole portion 17 as shown in FIG. 8. An elongate hole 71 for reducing weight is formed on the corner reinforcement portion 56. It should be noted that the example in which the corner reinforcement portion 56 of the antitheft reinforcement member 50 extends from the side reinforcement portion 52 in a direction orthogonal to a longitudinal direction of the elongate hole 62 shown in FIG. 9 (Y direction in FIG. 9) (X direction in FIG. 9) has been described. However, a length of the corner reinforcement portion 56 that extends in the X direction is not particularly limited. For example, the corner reinforcement portion 56 may extend to a position closer to the screw hole 66 in the X direction shown in FIG. 9. With this structure, the palm rest 7 can be reinforced positively and widely in the vicinity of the corner portion C.

(Structure of Corner Portion D)

Figure 12:
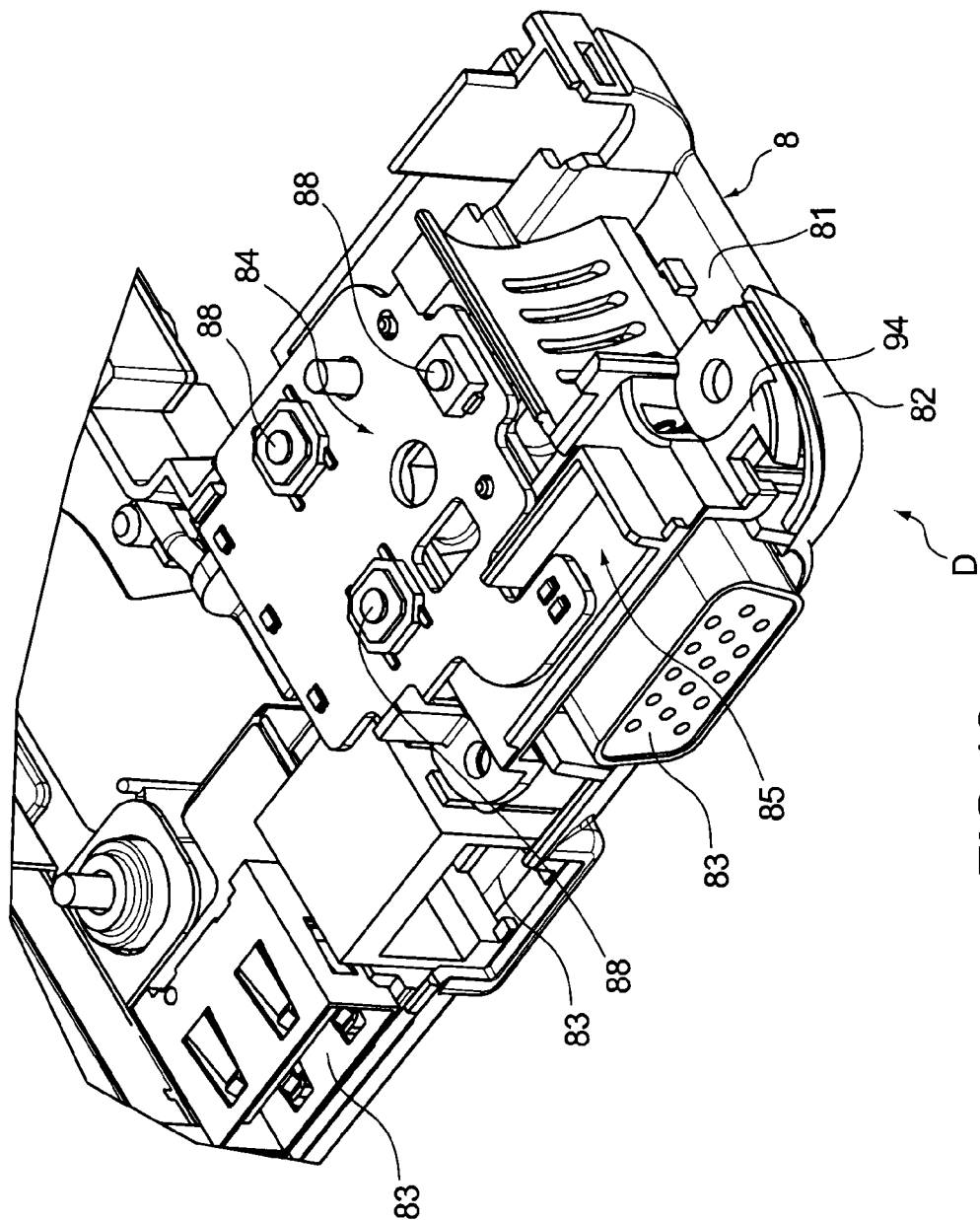
FIG. 12 is an enlarged perspective view of a bottom-side corner portion D in a state where the palm rest is removed from the main body portion of the electronic apparatus shown in FIG. 2.
Figure 13:
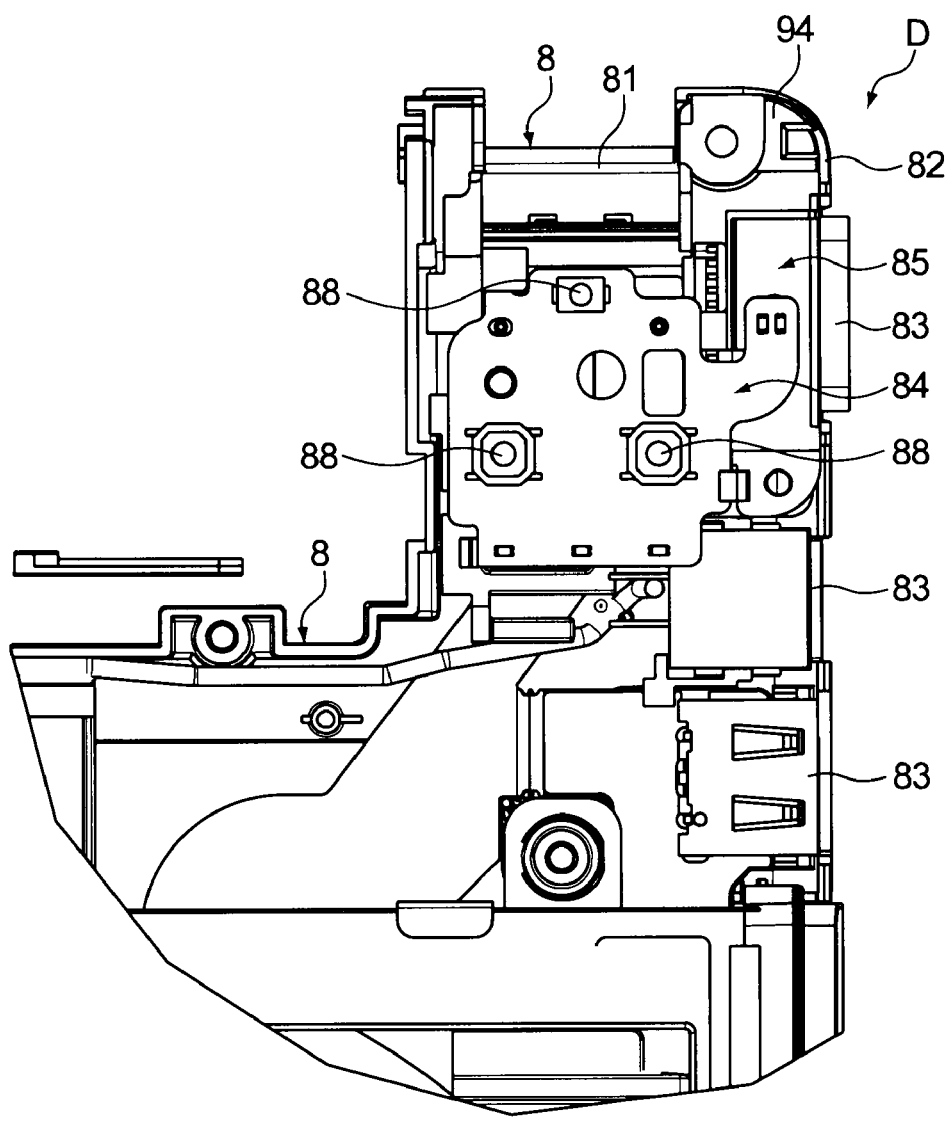
FIG. 13 is an enlarged plan view of the bottom-side corner portion D shown in FIG. 12.

FIG. 12 is an enlarged perspective view of the corner portion D on the bottom 8 side in a state where the palm rest 7 is removed from the main body portion 3 of the electronic apparatus 1 shown in FIG. 2. FIG. 13 is an enlarged plan view of the corner portion D on the bottom 8 side shown in FIG. 12.

The bottom 8 includes a bottom portion 81 constituting a bottom surface of the bottom 8 and a side wall portion 82 erected from the bottom portion 81. In the vicinity of the corner portion D of the bottom 8, a connection terminal portion 83 capable of connecting cables (not shown) is provided. In the vicinity of the corner portion D of the bottom 8, a switch substrate 84 is disposed via a mold member 85 while avoiding the connection terminal portion 83.

Mounted on the switch substrate 84 are a plurality of push-button-type switches 88 that are pressed when a user presses the buttons 10 shown in FIG. 1.

The mold member 85 has a function of reinforcing, as well as supporting the switch substrate 84, the side wall 12 of the palm rest 7 at the corner portion D, which is not shown in FIG. 12, and the side wall portion 82 of the bottom 8 from an inner side. The mold member 85 is a mold member that is interposed between the switch substrate 84 and the bottom 8 for supporting the switch substrate 84. A resin, for example, is used as a constituent material of the mold member 85.

Figure 14:
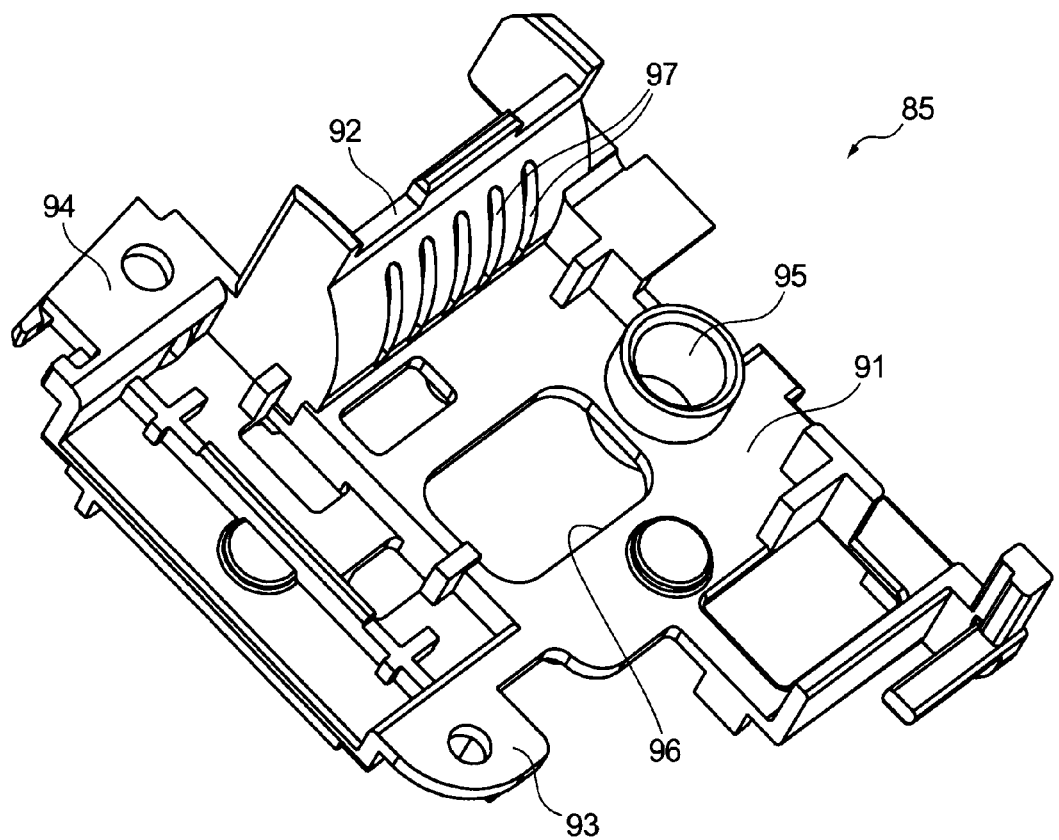
FIG. 14 is a perspective view of a mold member provided at the corner portion D shown in FIG. 12.

FIG. 14 is a perspective view of the mold member 85 provided at the corner portion D shown in FIG. 12. FIG. 15 are a six-sided view of the mold member 85 provided at the corner portion D shown in FIG. 12.

The mold member 85 includes a support portion 91, a side surface portion 92, a screwing portion 93, and a corner reinforcement portion 94.

The support portion 91 supports the switch substrate 84. The support portion 91 supports the switch substrate 84 by a surface on a side that cannot be seen in FIG. 14. The support portion 91 includes a boss 95 for screwing the mold member 85, the palm rest 7, and the bottom 8. A through-hole 96 for reducing weight of the mold member 85 is formed at a center of the support portion 91. The through-hole 96 is formed as large as possible, but not too large to lower a strength of the mold member 85.

The side surface portion 92 is erected from the support portion 91 and curved. A plurality of elongate through-holes 97 are formed on the side surface portion 92 at predetermined intervals. The screwing portion 93 protrudes from the support portion 91, and a screw hole into which a screw for screwing the mold member 85 to the bottom 8 is inserted is formed on the screwing portion 93.

The corner reinforcement portion 94 reinforces the side wall 12 of the palm rest 7 at the corner portion D and the side wall portion 82 of the bottom 8 at the corner portion D. The corner reinforcement portion 94 is provided opposed and adjacent to an inner surface 98 of the side wall 12 of the palm rest 7 at the corner portion D (see FIG. 3) and an inner surface of the side wall portion 82 of the bottom 8. The corner reinforcement portion 94 is curved along the inner surface 98 of the side wall 12 of the palm rest 7 at the corner portion D (see FIG. 3) and the inner surface of the side wall portion 82 of the bottom 8. The corner reinforcement portion 94 is disposed along the side wall 12 of the palm rest 7 at the corner portion D and the inner surface of the side wall portion 82 of the bottom 8. A screw hole into which a screw for screwing the mold member 85 to the bottom 8 is inserted is formed on the corner reinforcement portion 94.

(Operation Etc.)

According to the embodiment as described above, the palm rest 7 includes the side wall 12 that is erected from the flat plate portion 11 and constitutes the corner portion C. The elongate hole 18 is formed on the side wall 12 of the corner portion C. The antitheft reinforcement member 50 includes the corner reinforcement portion 56 provided adjacently along the inner surface 70 of the side wall 12 of the corner portion C (see FIGS. 8 and 9). Moreover, the elongate hole 62 that is in communication with the elongate hole 18 is formed on the antitheft reinforcement member 50.

With this structure, it is possible to insert the antitheft lock portion 100 into the elongate holes 18 and 62 on the side wall 12 of the palm rest 7 at the corner portion C and lock the lock portion 100 so as to prevent the electronic apparatus 1 from being stolen. As described above, using the antitheft reinforcement member 50, it is possible to reinforce the side wall 12 of the corner portion C by the corner reinforcement portion 56 as well as prevent the electronic apparatus 1 from being stolen. In other words, since the antitheft reinforcement member 50 exerts both the antitheft function and the reinforcement function, reinforcement of the corner portion C of the electronic apparatus 1 and a reduction in weight can be realized.

In particular, since the corner reinforcement portion 56 of the antitheft reinforcement member 50 is curved along the inner surface 70 of the side wall 12 as shown in FIGS. 8 and 10 and the corner reinforcement portion 56 is provided adjacently along the inner surface 70, an effect of reinforcing the side wall 12 of the corner portion C can be improved. As shown in FIGS. 9 and 10, the antitheft reinforcement member 50 includes the through-holes 61, 63, 71, and the like. Thus, weight of the antitheft reinforcement member 50 can be additionally reduced.

Since the elongate hole 18 for connecting the antitheft lock portion 100 can be provided on a rear side of the main body portion 3 that is far from a position of a user (see FIG. 3), wires connected to the lock portion 100 do not interfere with a user operation, with the result that a user operability is improved.

The antitheft reinforcement member 50 is fixed to the palm rest 7 and the bottom 8 by the screw holes 66, 64, and 67 at a plurality of points. Therefore, even when an external impact force is applied to the antitheft reinforcement member 50 via the side wall 12 at a time the electronic apparatus 1 is dropped with the corner portion C being the first to hit the ground or the like, the impact force can be positively absorbed at the plurality of points and the antitheft reinforcement member 50 can thus be positively prevented from being damaged at the screwing points.

The mold member 85 includes the corner reinforcement portion 94 that reinforces the side wall 12 of the palm rest 7 at the corner portion D, which is not shown in FIG. 12, and the side wall portion 82 of the bottom 8 at the corner portion D as shown in FIG. 12. The corner reinforcement portion 94 of the mold member 85 is curved along the inner surface 98 of the side wall 12 of the palm rest 7 at the corner portion D, which is not shown in FIG. 12, and the inner surface of the side wall portion 82 of the bottom 8, and disposed along the inner surface of the side wall portion 82 of the bottom 8.

Thus, by using the mold member 85, it is possible to reinforce the side wall 12 of the palm rest 7 at the corner portion D, which is not shown in FIG. 12, and the side wall portion 82 of the bottom 8 as well as support the switch substrate 84. In other words, since the mold member 85 exerts both the support function and the reinforcement function, it is possible to reinforce the side wall 12 of the corner portion D while realizing a reduction in weight of the electronic apparatus 1.

The corner reinforcement portion 94 of the mold member 85 is curved along the inner surface 98 of the side wall 12 of the palm rest 7 at the corner portion D, which is not shown in FIG. 13, and the inner surface of the side wall portion 82 of the bottom 8 shown in FIG. 13 and provided adjacently along the inner surface of the side wall 12 of the palm rest 7 at the corner portion D and the like. Therefore, an effect of reinforcing the side wall 12 of the palm rest 7 at the corner portion D and the side wall portion 82 of the bottom 8 can be improved. Since the mold member 85 is formed of a resin and the plurality of through-holes 96 and 97 are formed thereon as shown in FIG. 14, a reduction in weight can be realized.

As shown in FIG. 7, the metal reinforcement plate 40 is interposed between the inner surface 41 of the side wall 12 of the palm rest 7 in the vicinity of the corner portion B and the ribs 44 provided on the side surface of the boss 14 almost with no gap, and disposed adjacently along the curved inner surface 41. Therefore, using the metal reinforcement plate 40, the corner portion B of the palm rest 7 can be positively reinforced.

Specifically, with the metal reinforcement plate 40, it is possible to prevent the side wall 12 from being damaged or deformed at a time an external impact force is applied to the side wall 12 of the palm rest 7 in the vicinity of the corner portion B in the K direction. At this time, since the metal reinforcement plate 40 is provided adjacent to the ribs 44 on the side surface of the boss 14 almost with no gap, the impact force can be received by the boss 14 together with the metal reinforcement plate 40, with the result that the side wall 12 can more-positively be prevented from being dented, damaged, or the like. It should be noted that the side wall 12 of the palm rest 7 in the vicinity of the corner portion A can be positively reinforced in the same manner.

The metal reinforcement plate 40 is formed of the same material as the metal reinforcement plate 30. Accordingly, it is possible to lower production costs of the metal reinforcement plates 30 and 40, raise working efficiency of the metal reinforcement plate 40 and the like, and improve productivity of the electronic apparatus 1.

The side wall 12 constituting the corner portion B is tilted with respect to the flat plate portion 11 so as to tilt outwardly from the edge of the flat plate portion 11 as shown in FIG. 6. Moreover, as shown in FIG. 6, the metal reinforcement plate 30 is in contact with the inner surface 31 of the side wall 12 at a position near a position at which the side wall 12 sticks out most from the flat plate portion 11. The same holds true for the metal reinforcement plate 40 at the corner portion B.

Therefore, it is possible to positively reinforce the most-protruding parts of the corner portions A and B on which a largest impact force acts at a time the electronic apparatus 1 is dropped with the corner portion A or B being the first to hit the ground, for example.

The side reinforcement portion 52 of the antitheft reinforcement member 50 is opposed to the inner surface of the side wall 12 that gradually sticks out from the edge of the flat plate portion 11 of the palm rest 7 as shown in FIG. 11. The side reinforcement portion 52 of the antitheft reinforcement member 50 is capable of reinforcing, from the inner side of the side wall 12, the side wall 12 at a position near the position at which the side wall 12 sticks out most in the vicinity of the corner portion C. As a result, it is possible to positively reinforce, with the side reinforcement portion 52, the side wall 12 at the position that sticks out most, that is, a part on which a largest impact force acts when the electronic apparatus 1 is dropped with the corner portion C being the first to hit the ground or the like.

The corner reinforcement portion 94 of the mold member 85 is provided so as to come into contact with the inner surface of the side wall 12 that gradually sticks out from the edge of the flat plate portion 11 of the palm rest 7 that is not shown in FIG. 12. In other words, the corner reinforcement portion 94 of the mold member 85 is capable of reinforcing, from the inner side of the side wall 12, the side wall 12 at a position near the position at which the side wall 12 sticks out most in the vicinity of the corner portion D. As a result, it is possible to positively reinforce, with the corner reinforcement portion 94, the side wall 12 at the position that sticks out most, that is, a part on which a largest impact force acts when the electronic apparatus 1 is dropped with the corner portion D being the first to hit the ground or the like.

The embodiment of the present invention has been described heretofore. However, the present invention is not limited to the above embodiment and can be changed as appropriate within the technical scope of the present invention.

It should be noted that the above embodiment has described the example in which a single metal reinforcement plate 30 is provided at the corner portion A as shown in FIGS. 4 and 6. However, the present invention is not limited thereto, and it is also possible to provide, at the corner portion A, for example, another metal reinforcement plate (not shown) above or below the metal reinforcement plate 30 shown in FIG. 6. Also at the corner portion B, another metal reinforcement plate may be provided above or below the metal reinforcement plate 40. Accordingly, the palm rest 7 can be positively reinforced at the corner portion A and the like. It should be noted that even when the metal reinforcement plates 30 and 40 are made thicker, the effect of reinforcing the side wall 12 can similarly be improved.

The above embodiment has described the example in which the corner reinforcement portion 94 of the mold member 85 and the support portion 91 of the mold member 85 and the like have substantially the same thickness. However, the corner reinforcement portion 94 may be thicker than the support portion 91 and the like. As a result, the effect of reinforcing the side wall 12 of the palm rest 7 in the vicinity of the corner portion D can be improved.

The present application contains subject matter related to that disclosed in Japanese Priority Patent Application JP 2008-331971 filed in the Japan Patent Office on Dec. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
a casing that is rectangular and includes, on a first side wall near a first corner portion, a first hole portion into which an antitheft member is capable of being inserted; and
a first reinforcement portion that is formed in a single body, opposed to an inner side of the first corner portion, and includes
a second hole portion that is in communication with the first hole portion and constitutes a fixing hole capable of fixing the antitheft member together with the first hole portion, and
a first corner reinforcement portion that reinforces the first corner portion, the first corner reinforcement portion being curved according to a curvature of the first corner portion between adjacent sidewalls; wherein the first corner portion directly contacts the first sidewall and an adjacent sidewall defined by the first corner portion by curving along the inner side of the first corner portion.

2. The electronic apparatus according to claim 1,
wherein the first reinforcement portion is provided along a first inner surface of the first side wall of the first corner portion.

3. The electronic apparatus according to claim 1, further comprising:
an input signal control board provided near a second corner portion of the casing different from the first corner portion; and
a second reinforcement portion that is opposed to an inner side of a second side wall of the second corner portion and supports the input signal control board.

4. The electronic apparatus according to claim 3,
wherein the second reinforcement portion is provided along a second inner surface of the second side wall of the second corner portion.

5. The electronic apparatus according to claim 3, further comprising
a third reinforcement portion provided adjacent and opposed to a third inner surface of a third side wall of a third corner portion of the casing different from the first corner portion and the second corner portion.

6. The electronic apparatus according to claim 5,
wherein the casing includes a flat plate portion connected to the first side wall, the second side wall, and the third side wall,
wherein the third side wall of the third corner portion is tilted with respect to the flat plate portion such that the third side wall of the third corner portion tilts outwardly from an edge of the flat plate portion, and
wherein the third reinforcement portion is in contact with the third inner surface in a vicinity of a position at which the third side wall of the third corner portion sticks out most from the edge of the flat plate portion.

7. The electronic apparatus according to claim 1, wherein the first corner reinforcement portion contacts a curved inner side of the first corner portion between adjacent sidewalls.

8. The electronic apparatus according to claim 3, the second reinforcement portion further including in a single body a second corner reinforcement portion that reinforces the second corner portion.

9. The electronic apparatus according to claim 6, wherein the third reinforcement portion is metal.

* * * * *